US009373043B2

(12) United States Patent
Lu et al.

(10) Patent No.: US 9,373,043 B2
(45) Date of Patent: Jun. 21, 2016

(54) METHOD AND APPARATUS FOR DETECTING ROAD PARTITION

(71) Applicants: Yaojie Lu, Beijing (CN); Ganmei You, Beijing (CN); Jichuan Zheng, Beijing (CN)

(72) Inventors: Yaojie Lu, Beijing (CN); Ganmei You, Beijing (CN); Jichuan Zheng, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 351 days.

(21) Appl. No.: 13/708,013

(22) Filed: Dec. 7, 2012

(65) Prior Publication Data
US 2013/0148856 A1    Jun. 13, 2013

(30) Foreign Application Priority Data

Dec. 9, 2011   (CN) .......................... 2011 1 0409269

(51) Int. Cl.
*G06K 9/00*    (2006.01)
(52) U.S. Cl.
CPC .................................. *G06K 9/00798* (2013.01)
(58) Field of Classification Search
CPC ........... G06K 9/00798; G06K 9/00208; G06T 2207/30256; G06T 2207/10028
See application file for complete search history.

(56) References Cited

U.S. PATENT DOCUMENTS

| | | | | |
|---|---|---|---|---|
| 5,937,079 A * | 8/1999 | Franke | ................... | G06K 9/209 348/E13.014 |
| 6,980,210 B1 * | 12/2005 | Weiglhofer et al. | ......... | 345/419 |
| 7,346,190 B2 * | 3/2008 | Taniguchi | .......... | G06K 9/00798 340/907 |
| 8,208,021 B2 * | 6/2012 | Unoura | ........................ | 348/148 |
| 8,687,896 B2 * | 4/2014 | Yoshimi | ........................ | 382/199 |
| 8,724,094 B2 * | 5/2014 | Miyahara et al. | ............ | 356/5.01 |
| 2003/0103650 A1 * | 6/2003 | Otsuka et al. | ................. | 382/104 |
| 2004/0125207 A1 * | 7/2004 | Mittal et al. | ................... | 348/169 |
| 2004/0153229 A1 * | 8/2004 | Gokturk et al. | ................. | 701/45 |
| 2004/0218784 A1 * | 11/2004 | Nichani et al. | ................. | 382/103 |
| 2005/0135658 A1 * | 6/2005 | Yamamoto et al. | ........... | 382/104 |
| 2005/0196019 A1 * | 9/2005 | Taniguchi et al. | ............. | 382/104 |
| 2006/0095207 A1 * | 5/2006 | Reid | .............................. | 701/301 |
| 2006/0153450 A1 * | 7/2006 | Woodfill et al. | .............. | 382/173 |
| 2007/0071311 A1 * | 3/2007 | Rovira-Mas et al. | ......... | 382/154 |
| 2007/0206833 A1 * | 9/2007 | Otsuka et al. | ................. | 382/103 |
| 2007/0255480 A1 * | 11/2007 | Southall et al. | ................. | 701/96 |
| 2007/0274566 A1 * | 11/2007 | Fujimoto | ....................... | 382/103 |
| 2007/0291125 A1 * | 12/2007 | Marquet | .................. | 348/207.99 |
| 2007/0291130 A1 * | 12/2007 | Broggi et al. | .............. | 348/218.1 |
| 2008/0013790 A1 * | 1/2008 | Ihara et al. | .................... | 382/104 |

(Continued)

FOREIGN PATENT DOCUMENTS

EP    2608111 A2 *   6/2013

OTHER PUBLICATIONS

Ventroux, Nicolas, Renaud Schmit, Frédéric Pasquet, P-E. Viel, and Stéphane Guyetant. "Stereovision-based 3D obstacle detection for automotive safety driving assistance." In Intelligent Transportation Systems, 2009. ITSC'09. 12th International IEEE Conference on, pp. 1-6. IEEE, 2009.*

(Continued)

*Primary Examiner* — Gandhi Thirugnanam
(74) *Attorney, Agent, or Firm* — Harness, Dickey & Pierce P.L.C.

(57) ABSTRACT

A method and an apparatus are used for detecting a road partition, the method comprising: a step of obtaining a disparity top view having a road area; and a step of detecting parallel lines as the road partitions from the disparity top view.

14 Claims, 7 Drawing Sheets

(56) References Cited

U.S. PATENT DOCUMENTS

| | | | |
|---|---|---|---|
| 2009/0028389 A1* | 1/2009 | Edanami | 382/104 |
| 2009/0041337 A1* | 2/2009 | Nakano | 382/154 |
| 2010/0080467 A1* | 4/2010 | Sakurai | 382/195 |
| 2010/0104139 A1* | 4/2010 | Kuehnle et al. | 382/106 |
| 2010/0104175 A1* | 4/2010 | Woodfill et al. | 382/154 |
| 2010/0121577 A1* | 5/2010 | Zhang et al. | 701/301 |
| 2010/0208034 A1* | 8/2010 | Chen | 348/46 |
| 2010/0246896 A1* | 9/2010 | Saito | 382/106 |
| 2010/0309674 A1* | 12/2010 | Su et al. | 362/466 |
| 2010/0329513 A1* | 12/2010 | Klefenz | 382/104 |
| 2011/0115615 A1* | 5/2011 | Luo et al. | 340/436 |
| 2011/0261168 A1* | 10/2011 | Shima et al. | 348/47 |
| 2011/0311108 A1* | 12/2011 | Badino et al. | 382/106 |
| 2012/0026332 A1* | 2/2012 | Hammarstrom et al. | 348/148 |
| 2012/0081512 A1* | 4/2012 | Shimizu | 348/36 |
| 2012/0112037 A1* | 5/2012 | Hiramoto et al. | 250/206 |
| 2012/0128215 A1* | 5/2012 | Satoh | 382/113 |
| 2012/0143430 A1* | 6/2012 | Broggi et al. | 701/28 |
| 2012/0173083 A1* | 7/2012 | Hsu et al. | 701/45 |
| 2012/0269382 A1* | 10/2012 | Kiyohara et al. | 382/103 |
| 2012/0294482 A1* | 11/2012 | Kasaoki | 382/103 |
| 2012/0327233 A1* | 12/2012 | Imai et al. | 348/148 |
| 2013/0038734 A1* | 2/2013 | Furukawa | 348/148 |
| 2013/0057658 A1* | 3/2013 | Allezard et al. | G06K 9/00798 348/47 |
| 2013/0089269 A1* | 4/2013 | Barnum | G06T 5/003 382/261 |
| 2013/0101160 A1* | 4/2013 | Woodfill et al. | 382/103 |
| 2013/0113881 A1* | 5/2013 | Barnum | H04N 13/0018 348/43 |
| 2013/0128001 A1* | 5/2013 | You et al. | 348/47 |
| 2013/0135444 A1* | 5/2013 | Stein et al. | 348/47 |
| 2013/0141580 A1* | 6/2013 | Stein et al. | 348/148 |
| 2013/0148856 A1* | 6/2013 | Lu et al. | 382/104 |
| 2013/0163821 A1* | 6/2013 | You | G01C 21/28 382/104 |
| 2013/0177237 A1* | 7/2013 | Schamp | 382/154 |
| 2013/0272577 A1* | 10/2013 | Sakamoto | 382/103 |
| 2014/0037145 A1* | 2/2014 | Schamp | 382/104 |
| 2014/0086451 A1* | 3/2014 | Liu et al. | 382/103 |
| 2014/0086477 A1* | 3/2014 | You et al. | 382/154 |
| 2014/0118485 A1* | 5/2014 | Luo et al. | 348/36 |
| 2015/0049913 A1* | 2/2015 | Zhong | 382/104 |

OTHER PUBLICATIONS

Lombardi, P.; Zanin, M.; Messelodi, S., "Unified stereovision for ground, road, and obstacle detection," Intelligent Vehicles Symposium, 2005.*

Braillon, Christophe, Cédric Pradalier, Kane Usher, James L. Crowley, and Christian Laugier. "Occupancy grids from stereo and optical flow data." In Experimental Robotics, pp. 367-376. Springer Berlin Heidelberg, 2008.*

Soquet, N.; Aubert, D.; Hautiere, N., "Road Segmentation Supervised by an Extended V-Disparity Algorithm for Autonomous Navigation," Intelligent Vehicles Symposium, 2007.*

Zhencheng Hu; Uchimura, K., "U-V-disparity: an efficient algorithm for stereovision based scene analysis," Intelligent Vehicles Symposium, 2005.*

Sameera Kodagoda, "Stereo vision for obstacle detection in autonomous vehicle navigation" 2010.*

Zhao, Jun. Stereo Imaging and Obstacle Detection Methods for Vehicle Guidance. Diss. University of New South Wales, Australia, 2008.*

"Difference between Disparity map and Disparity Image in Stereo Matching", 2013, http://stackoverflow.com/questions/17607312/difference-between-disparity-map-and-disparity-image-in-stereo-matching/3#3, p. 1-3.*

"Chapter 11: Depth", Date Unknown, http://www.cse.usf.edu/~r1k/MachineVisionBook/MachineVision.files/MachineVision_Chapter11.pdf, p. 289-308.*

* cited by examiner

BEFORE REMOVAL

AFTER REMOVAL

FIG.5

DISPARITY MAP

DISPARITY TOP VIEW

METHOD AND APPARATUS FOR DETECTING ROAD PARTITION

BACKGROUND OF THE INVENTION

1. Field of the Invention

The present invention relates to road detection and object detection, and specifically, a method and an apparatus for detecting road partitions.

2. Description of the Related Art

The driving assistance system is becoming more popular. The LDW/RDW (Lane/Road detection warning) system, a subsystem of the driving assistance system, can avoid collisions and help to determine driving directions accurately. A road or lane detection is very important for the LDW/RDW system, because only by knowing road information can a further process such as warning be performed. In general, a road or a lane is detected by detecting road partitions.

The road partitions include road shoulders, white lines, fences and other objects by which a road area and lanes can be identified.

In general, there are two types of methods for detecting the road: a method by using features and a method by modeling.

In the method by using features, the road or lane of a road image is located by combining some road features, such as colored lines or lane edges.

In the method by modeling, a road model, such as a straight line or a parabola, is determined first, then the road is represented by some parameters.

Only a few specific features of the road partitions are considered in these two methods, therefore it is impossible to detect every feature of the road partitions flexibly. For example, the modeling method is applied to road shoulders, not to white lines or fences, and it is inefficient to construct a special model for each road partition.

In the cited reference (U.S. Pat. No. 7,346,190B2), a method for detecting a road is disclosed. In this method, three-dimensional coordinates are projected as two-dimensional coordinates along a direction across the road, histograms along the direction across the road are generated, and lane lines are determined according to the histograms. This method is invalid in cases where height of the road is different, like a sloping road.

Furthermore, most of road detections in prior art are based on a single color image or a polarizing image, therefore it is inefficient for the road detection in cases of a feeble image of a road edge or a complicated environment with a slanted road.

SUMMARY OF THE INVENTION

The present invention is made in light of the above problems.

According to an aspect of the present invention, a method of detecting a road partition may comprise: a step of obtaining a disparity top view having a road area; and a step of detecting parallel lines as the road partitions from the disparity top view.

In the method of detecting a road partition, the step of detecting the parallel lines from the disparity top view may comprise: a step of regarding points with a zero disparity value as basic points, and calculating included angles between straight lines, that are determined by points having a non-zero disparity values in the disparity top view and the basic points and an equal disparity line, so as to obtain angle distributions of the included angles relating to the basic points; and a step of detecting the parallel lines according to the angle distributions of the included angles of the basic points.

In the method of detecting a road partition, the step of detecting the parallel lines according to the angle distributions of the included angles of the basic points may comprise: a step of regarding top N basic points in descending order of degree of collectivity of the angle distributions of the included angles and/or the basic points having a value of degree of collectivity more than a predetermined threshold of degree of collectivity as road vanishing points, where N is an integer greater than or equal to one, the road vanishing point is a point at which the parallel road partitions intersect in the disparity top view, and the points at which the parallel road partitions in different directions intersect in the disparity top view are different; and a step of regarding straight lines determined by the included angles, that have occurrence degrees of angles in the angle distributions of the included angles relating to the road vanishing points being more than a predetermined threshold, and the road vanishing points, as the parallel lines in which the road partitions are located.

The method of detecting a road partition may further comprise: a step of performing a further distinguishment of the road partitions according to at least one of height features, location features or area features of the detected road partitions in a corresponding disparity map, after the parallel lines of the disparity top view are determined as the road partitions.

In the method of detecting a road partition, the step of obtaining the disparity top view having the road area may comprise: a step of obtaining a disparity map having the road area; a step of estimating the road area and removing a non-road area from the disparity map; and a step of obtaining the disparity top view having the road area by converting the disparity map where the non-road area has been removed.

According to another aspect of the present invention, an apparatus for detecting a road partition may comprise: a disparity top view obtainment unit for obtaining a disparity top view having a road area; and a road partition detection unit for detecting parallel lines as the road partition from the disparity top view.

The method and apparatus for detecting the road partition of the present invention detects the parallel lines as the road partitions by the disparity top view; therefore, the effect of different heights of road partitions can be eliminated, and many forms of road partitions can be detected at one time.

Furthermore, the method and apparatus for detecting the road partitions of the present invention can also be applied to detection of the road partitions of a uneven road.

The method and apparatus for detecting the road partitions of the present invention take full advantage of a feature that the parallel lines intersect at a point with zero disparity value in the disparity top view. Therefore, plural road partitions can be detected at the same time, and the accuracy of the detection is ensured because of the mutual restraint of the plural road partitions.

DETAILED DESCRIPTION OF THE PREFERRED EMBODIMENTS

In the following, embodiments of the present invention are described with reference to the accompanying drawings, so as to facilitate the understanding of the present invention.

The embodiments of the present invention will be described in the following order:
1. Summary of Idea or Invention, and Introduction of Essential Concepts
2. Embodiments
 2.1. Overall Process of Road Partitions Detection
 2.2. Disparity Top View Obtainment
 2.3. Parallel Lines Detection from Disparity Top View
  2.3.1. Angle Distributions of Included Angles relating to Basic Points
  2.3.2. Road Vanishing Points Determination
  2.3.3. Road Partitions Detection as Parallel Lines
  2.3.4. Further Distinguishment of Road Partitions
 2.4. Apparatus for Detecting Road Partitions
3. Summary

1. Summary of Idea or Invention, and Introduction of Essential Concepts

Before the detailed description, the idea of the present invention will be introduced generally, so as to facilitate the understanding of the present invention. All types of the road partitions, such as white lines, road shoulders, fences and road edges have a commonality in that all of them generally are parallel. They vary in height and area; for example, the fences are highest and have the largest area, the road shoulders come second, and the white lines are lowest and have the smallest area. U-disparity has two following features: first, a feature of top view or Bird's-eye view (so that hereafter referred to as "disparity top view"), namely, the feature of height dimension is eliminated; second, in the disparity top view, the parallel lines intersect at a disparity point with zero disparity value. Therefore, the present invention uses these two features of the disparity top view, and detects the parallel lines from the disparity top view so as to detect all kinds of the road partitions at one time.

Essential concepts will be introduced as follows.

Disparity indicates an angle made by two straight lines that are drawn from opposite ends of a base line to a distant object. That is to say, it means a direction difference generated by looking at the same object from two points having a certain separation distance. The angle that is generated by looking at the two points from the object is called a disparity angle of the two points, and the distance between the two points is called a basic line. A distance between the object and an observer can be calculated as long as the disparity angle and length of the basic line are known.

A disparity map is an image that is based on a reference image, the size of the disparity, and the size of the reference image; and an element value of the disparity map is a disparity value. The disparity map includes distance information of a scene. The disparity map may be calculated from left and right images picked up by a binocular camera or calculated from a depth map of a stereogram.

The coordinates of a point of a common two-dimensional disparity map are represented by $(u,v)$, where u is abscissa and v is ordinate; a pixel value of a pixel at a point $(u,v)$ is represented by $d(u,v)$, which represents the disparity of the point $(u,v)$.

The disparity top view or U-disparity map may be calculated from the disparity map. The grey level of any point $(u,v)$ of a U-disparity map is the number of the points of the corresponding disparity map where the abscissa is u and the disparity value of the ordinate is equal to d.

2. Embodiments

<2.1 Overall Process of Road Partitions Detection>

Figure 1:
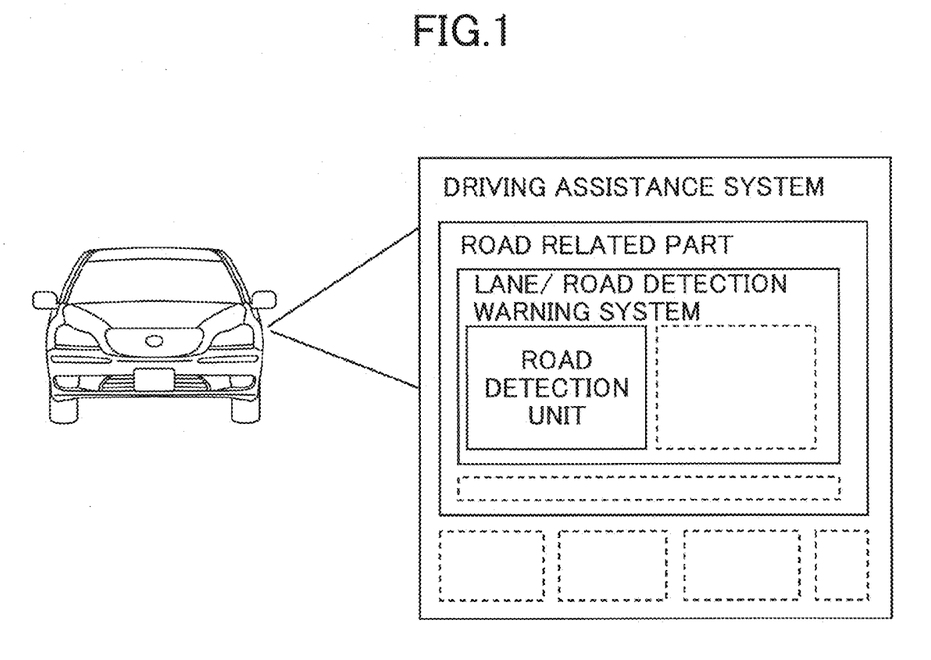
FIG. 1 is a schematic drawing illustrating a vehicle system as an example of an application environment of the present invention, which may facilitate the understanding of the present invention.

FIG. 1 is a schematic drawing illustrating a vehicle system as an example of an application environment of the present invention, which may facilitate the understanding of the present invention. An application of software or hardware according to the present invention may be applied to a road detection unit thereof.

Figure 2:
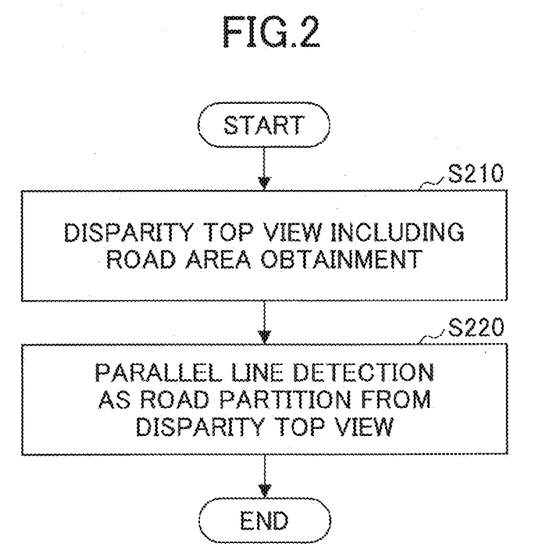
FIG. 2 is an overall flowchart illustrating the method of detecting the road partition according to the embodiment of the present invention.

FIG. 2 is an overall flowchart illustrating the method 200 of detecting the road partition according to the embodiment of the present invention.

In step S210, a disparity top view having a road area is obtained. As described above, a disparity map having the road area may be obtained by picking up by a binocular camera, a multi camera, a stereoscope camera and calculating, and the disparity top view is obtained by converting the disparity map; or the depth map is obtained from a stereogram, the disparity map is obtained based on the depth map, and the disparity top view is obtained by converting the disparity map. A embodiment of step S210 will be described later with reference to FIG. 3.

In step S220, parallel lines are detected as the road partitions from the disparity top view. As described above, in most cases, the road partitions such as road shoulders, fences or all kinds of road partition lines are parallel. Therefore, the road partitions may be detected by detecting the parallel lines. The method of detecting the parallel lines from the disparity top view will be described in detail later with reference to FIG. 6.

<2.2 Disparity Top View Obtainment>

Figure 3:
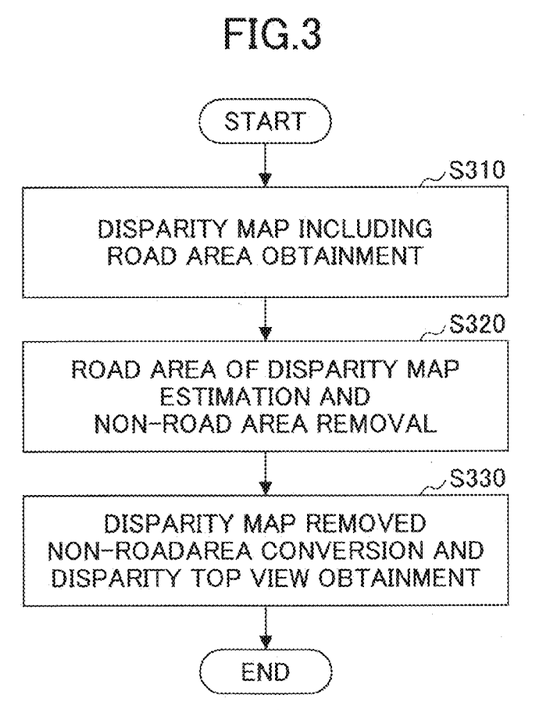
FIG. 3 is a flowchart illustrating an example of the method of obtaining the disparity top view having the road area according to the embodiment of the present invention.

FIG. 3 is a flowchart illustrating an example of the method for obtaining the disparity top view having the road area of step S210 of FIG. 2 according to the embodiment of the present invention.

In step S310, the disparity map having the road area is obtained. Specifically, for example, a left image and a right image may be picked up by a binocular camera on a vehicle, and the disparity map may be calculated based on the left image and the right image.

In step S320, the road area is estimated, and a non-road area is removed from the disparity map.

The method of estimating the road area includes the following methods: 1) considering a constantly changing of an angle of the camera, the road area may be estimated by a parameter of the camera such as angle or height; 2) it may be performed by a v-disparity map, for example, by seeking out slant lines of the v-disparity map; and 3) a method introduced in the art such as "Road Approximation in Euclidean and V-disparity Space: A Comparative Study" by Angle D.Sappa. Alternatively, information of the road area may be specified artificially.

After the information of the road area has been obtained, the non-road area is removed from the disparity map.

In addition, all of the points having a height above ground which is higher than a predetermined height threshold rh may be removed, because the points having a height which is greater than rh may represent noise such as a vehicle on the road, a person riding a bicycle or a telegraph pole.

Figure 4:
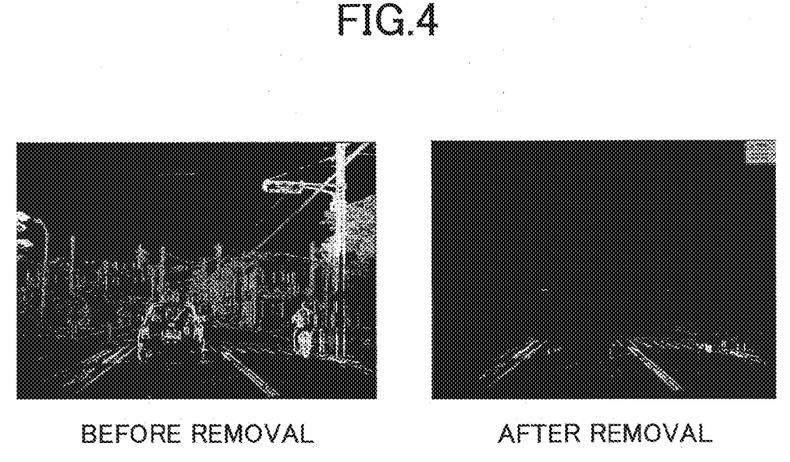
FIG. 4 is a schematic drawing illustrating the comparison between the disparity maps before and after removing the road area from the disparity map.

FIG. 4 is a schematic drawing illustrating the comparison between the disparity maps before and after removing the non-road area from the disparity map. The left drawing represents the disparity map before a removal operation, and the right drawing represents the disparity map after a removal operation.

The effect of a non-target object can be decreased by removing the non-road area, so that the accurate rate and speed of the subsequent road partitions detection is improved.

In step S330, the disparity top view having the road area is obtained by converting the disparity map having the non-road area removed.

The conversion operation is as follows. The disparity map D is represented by:

$$D=d(u,v) \text{ where } u \in [0,w), v \in [0,h)$$

where h is the height of the disparity map, w is the width of the disparity map, and $d_i(u_i,v_i)$ is a disparity value of a point $(u_i,v_i)$.

The corresponding disparity top view U is represented by:

$$U=p_u(u,d) \text{ where } u \in [0,w), d \in (0,d\text{max}]$$

where dmax is a disparity maximal value of the disparity map D.

$P_{ui}(u_i,d_i) \in U$ of the disparity top view is the grey level of the point $(u_i,d_i)$ of the disparity top view, a value which is equal to the number of all of the points of the corresponding disparity map in which $u=u_i$ and $d=d_i$ are met, namely, the number of the points where abscissa is $u_i$ and disparity of ordinate is $d_i$.

Figure 5:
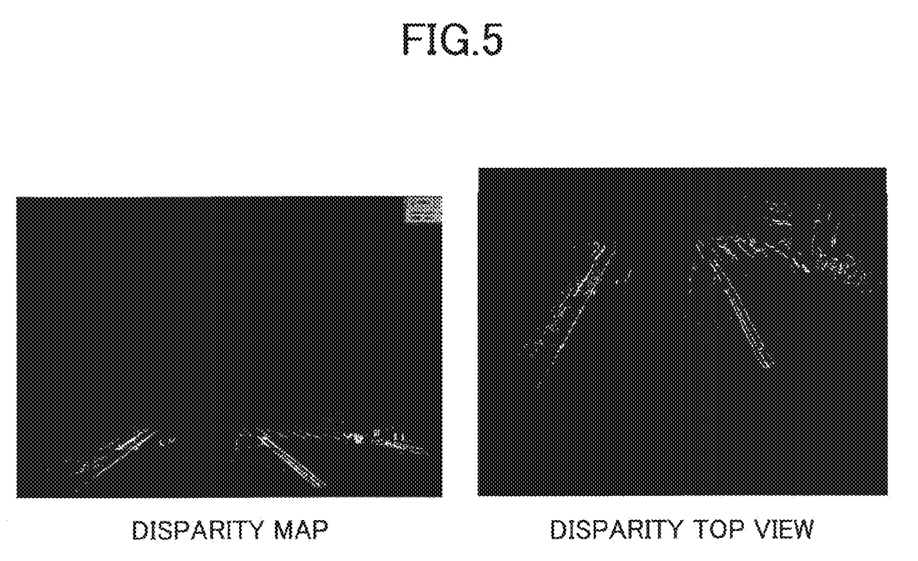
FIG. 5 is a schematic drawing illustrating the comparison between the disparity map of FIG. 4 and the disparity top view after converting.

FIG. 5 is a schematic drawing illustrating the disparity map having the non-road area removed and the disparity top view after converting.

In addition, subsequent processing such as noise reduction may be performed for the obtained disparity top view. An implementation way is removing points whose grey level is less than a predetermined threshold from the disparity top view, namely, modifying the grey levels of points whose grey level is less than a predetermined threshold to zero. The reason is that noise is usually a discrete point, and there are not many discrete points having the same disparity in each column of the disparity map. Furthermore, to avoid removing partition lines such as white lines unconsciously, preferably, the predetermined threshold may be set to a smaller value such as one.

<2.3 Parallel Lines Detection from Disparity Top View>

Figure 6:
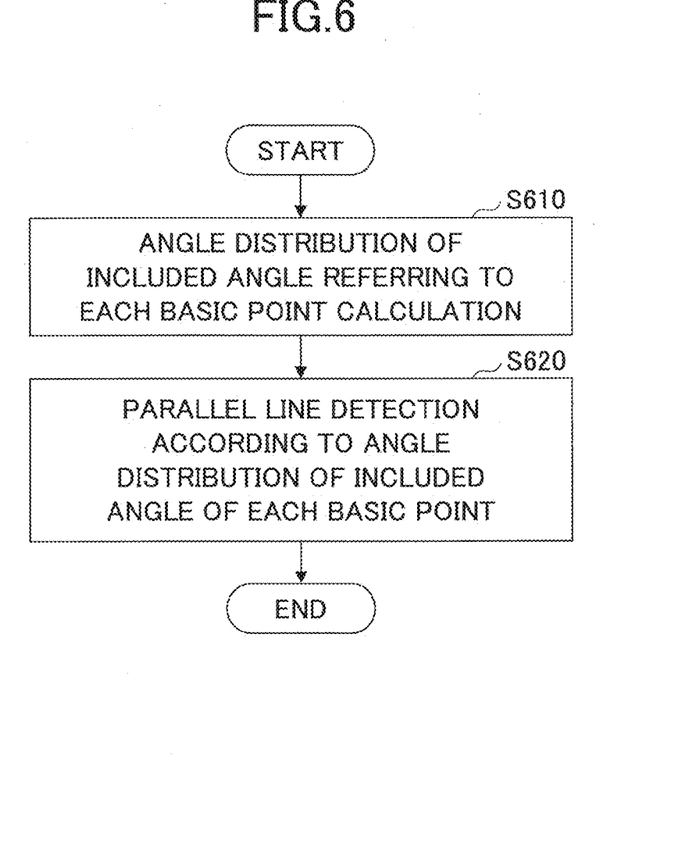
FIG. 6 is a flowchart illustrating an example of the method of detecting parallel lines as the road partitions from the disparity top view.

FIG. 6 is a flowchart illustrating an example of a method for detecting parallel lines as the road partitions from the disparity top view.

As illustrated in FIG. 6, in step S610, angle distributions of included angles relating to each basic point are calculated. Specifically, points with zero disparity value are regarded as basic points, and included angles between straight lines determined by each point having a non-zero disparity value of the disparity top view and the basic points, and an equal disparity line are calculated, so as to obtain angle distributions of the included angles relating to the basic points. The operation of the above step will be described in detail later with reference to FIG. 7.

In step S620, the parallel lines are detected according to the angle distributions of the included angles of the basic points. The operation of the above step will be described in detail later with reference to FIG. 8.

<2.3.1 Angle Distributions of Included Angles relating to Basic Points>

As described above, in the three-dimensional space, parallel lines do not intersect, or may be considered that they intersect at infinity. However, in the disparity top view, parallel lines intersect at a point in which the disparity value is equal to zero.

The point of intersection is called a road vanishing point. The disparity value of the point that is equal to zero indicates that the point looks the same by the left and right eye, and the point should be at infinity. In the disparity top view, the points in which the disparity value is equal to zero are located in a horizontal line and collectively called basic points. Therefore, the next operation is to determine which of some basic points is/are the intersection point(s) of the parallel lines, namely, the road vanishing point(s).

In cases where the road partitions are parallel to each other, there is only one road vanishing point in the disparity top view, this road vanishing point is set as (x0,0), and all of the road partitions of the disparity top view intersect at this road vanishing point. For one road partition such as a not-shown fence A, in the disparity top view, all of the points that belong to the fence A are located in a not-shown line 1a across the road vanishing point (x0,0); for another road partition such as a not-shown fence B, in the disparity top view, all of the points that belong to the fence B are located in another line 1b across the road vanishing point (x0,0); for another road partition such as a not-shown fence C, in the disparity top view, all of the points that belong to the fence C are located in another line 1c across the road vanishing point (x0,0). Therefore, in the angle distributions of the included angles between straight lines determined by each point having a non-zero disparity value of the disparity top view and the basic points, and the equal disparity line, in contrast with other basic points, the angle distribution of the road vanishing point (x0,0) is most concentrated, namely, degree of dispersion is lowest. The reason is that the included angles of each point of the same road partition relating to the road vanishing point are the same; namely, the angle distribution may be more concentrated. On the other hand, for a basic point that is not the road vanishing point, the included angles of those relating to the basic point are different; namely, the angle distribution may be more dispersed, even though all of the points are located in the same road partition. Therefore, the road vanishing points may be obtained from a point where the distribution is more concentrated, by determining the angle distributions of the basic points. After the road vanishing points are determined, the straight lines that intersect at the road vanishing point may be determined, so as to detect the parallel lines as the road partitions.

Figure 7:
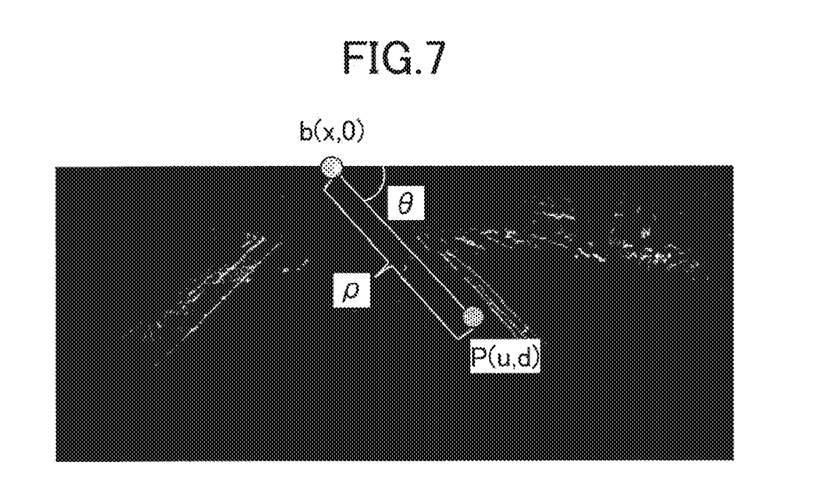
FIG. 7 is a schematic drawing illustrating the included angles of the basic points and the angle calculation.

FIG. 7 is a schematic drawing illustrating the included angles relating to the basic points and the angle calculation.

As illustrated in FIG. 7, the basic point is represented by b(x,0), where x∈[0,w), disparity lines in which the basic points are located are represented by m (not-shown), any one of the points having non-zero disparity in the disparity top view is represented by p(u,d)∈U, the straight line across the basic point b and point p is represented by ρ, and the included angle between the straight lines m and ρ is represented by θ.

The tangent of the included angle θ is as follows.

$$tg\theta = \frac{d}{u-x}$$

Therefore, the included angle θ can be calculated.

For all of the points having non-zero disparity in the disparity top view, after the above included angles θ are calculated, the distributions of the included angles θ may be calculated according to the following equation.

$$Dis_x(\theta) = \frac{C_\theta}{N}$$

where θ∈Θ, X is a set of the basic points, N is the number of the points having a non-zero disparity value in the disparity top view, Θ is a set of angular values of the included angles θ.

$C_\theta$ is the number of the points having non-zero disparity values where the included angles between the straight lines determined by the basic point X and each of the points having non-zero disparity values of the disparity top view and the equal disparity line is equal to θ.

Figure 8:
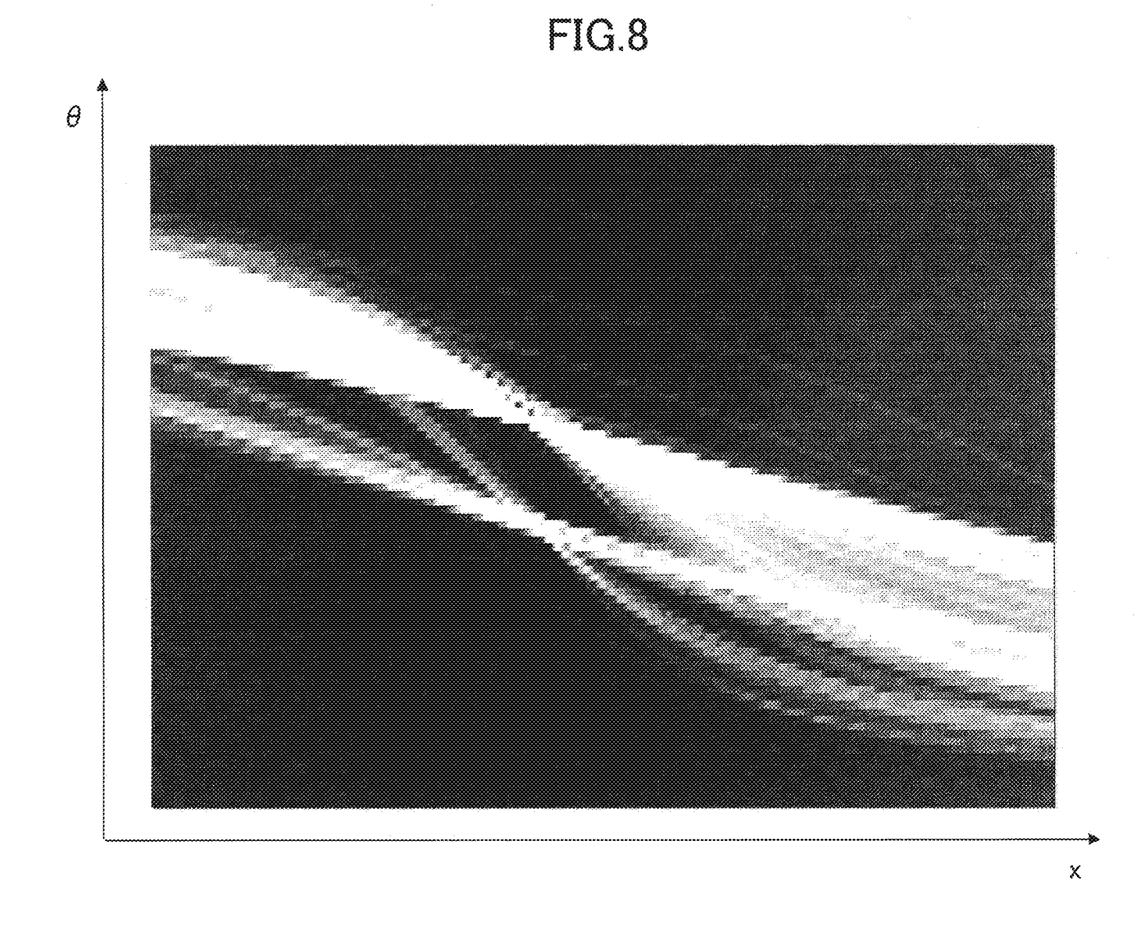
FIG. 8 is a schematic drawing illustrating the angle distributions of the included angles.

FIG. 8 is a schematic drawing illustrating the angle distributions of the included angles. Abscissa x indicates the location of the basic point, ordinate θ indicates the included angle, and grey level of each point indicates distribution $Dis_x(\theta)$ of the included angles θ relating to the basic point x.

<2.3.2 Road Vanishing Points Determination>

After the distributions of the included angels are determined, top N basic points in descending order of degree of collectivity of the angle distributions of the included angles may be regarded as the road vanishing points, where N is an integer greater than or equal to one. As described above, the road vanishing point is a point at which the parallel road partitions intersect in the disparity top view, and the points at which the parallel road partitions in different direction intersect in the disparity top view are different. That is to say, there is a possibility of plural road vanishing points, for example, there is a possibility of two road vanishing points in the disparity top view corresponding to the crossroads.

The above method where the top N basic points are obtained is just an example, and the basic points having a value of degree of collectivity more than a predetermined threshold may be regarded as road vanishing points.

Therefore, degree of collectivity of the included angles θ relating to the basic points are calculated. For example, degree of collectivity may be simulated according to the following equation:

$$Enp = -\Sigma_\theta(Dis(\theta) \times \log(Dis(\theta)))$$

where a smaller ENP indicates a larger degree of collectivity of the included angles θ relating to the basic point, namely, a lower degree of spread.

Figure 9:
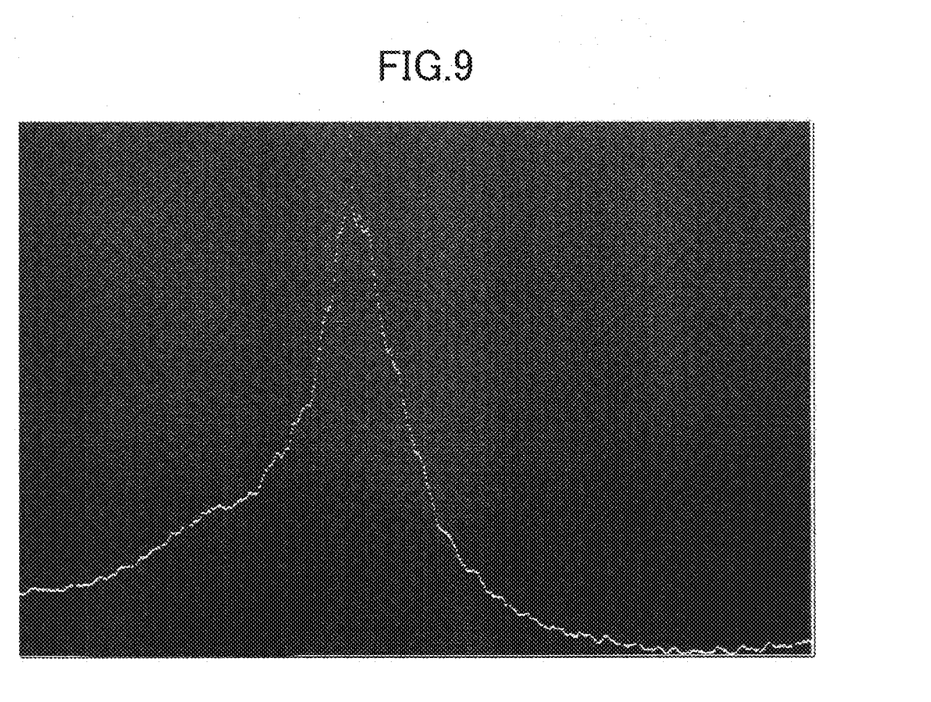
FIG. 9 is a schematic drawing illustrating a curve of collectivity degree of the basic points.

FIG. 9 is a schematic drawing illustrating a curve of collectivity degree of the basic points. The abscissa is the location of the basic point, and the ordinate is the degree of collectivity such as −Enp.

The above method of calculating degree of collectivity of the included angles is just an example, and other methods relating to degree of collectivity of the distributions, for example a method of information clustering such as DBSCAN, OPTICS and DENCLUE, may also be applied.

After the degree of collectivity of the distributions of the included angles of each basic point are determined, the basic point having a smallest ENP may be selected as the road vanishing point.

Top N, for example, top two basic points in descending order of degree of collectivity may be regarded as the road vanishing points, in cases where it is considered that there is a possibility of plural road vanishing points (for example, at crossroads).

Alternatively, the basic points having a value of degree of collectivity more than a predetermined threshold may be selected as the road vanishing points.

Alternatively, top N basic points in descending order of degree of collectivity, that have a value of degree of collectivity more than a predetermined threshold of degree of collectivity may be selected as the road vanishing points.

<2.3.3 Road Partitions Detection as Parallel Lines>

After the road vanishing points are determined, the straight lines that intersect the road vanishing points may be determined as the road partitions.

Specifically, the road vanishing point is represented by b0(x0,0), and an angle set of the included angles relating to the road vanishing point b0(x0,0) is represented by ANGS. Occurrence degrees $Dis_{x0}(\theta)$ of each angle θ of the angle set ANGS is calculated, and the straight lines determined by the included angles that have occurrence degrees $Dis_{x0}(\theta)$ being more than a predetermined threshold $t_\theta$ and the road vanishing point b0, are regarded as the parallel lines in which the road partitions is located.

Namely, the included angles $\theta_t$ determined by the road partitions and the road vanishing points should meet the following equation.

$$\theta_t \in ANGS \text{ and } Dis_{x0}(\theta_t) > t_\theta$$

That is to say, the more points having angle $\theta_t$ of the included angles relating to the road vanishing point b0(x0,0) there are, the more likely it is that these points are located in a straight line.

The straight line determined by the determined included angle $\theta_t$ and the road vanishing point b0(x0,0) is regarded as the road partition.

Figure 10:
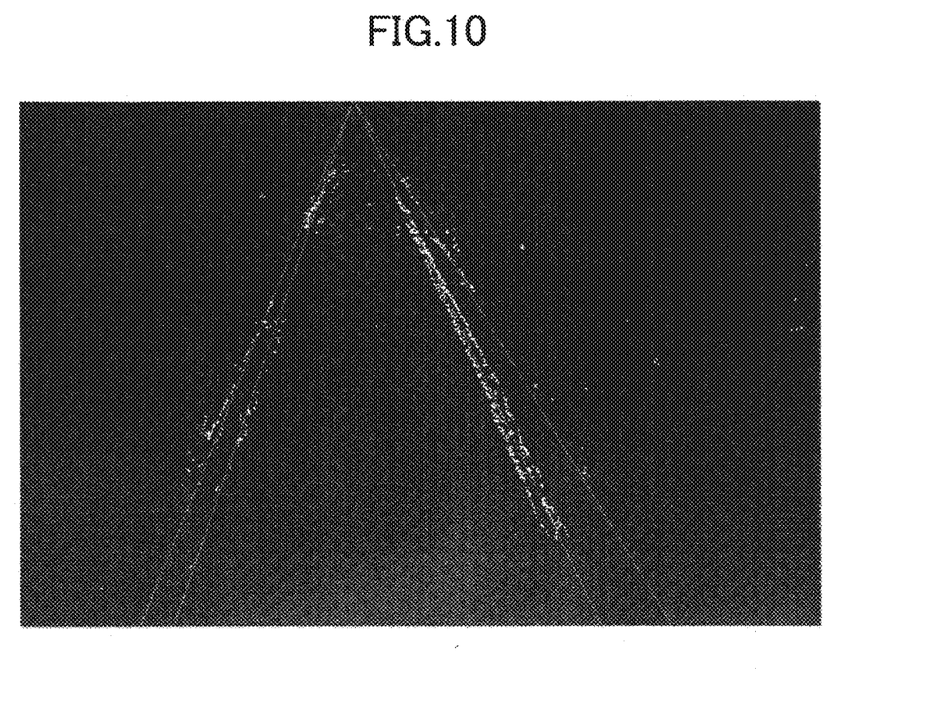
FIG. 10 is a schematic drawing illustrating the road vanishing points detected from the disparity top view and the parallel lines regarded as the road partitions according to the embodiment of the present invention.

FIG. 10 is a schematic drawing illustrating the road vanishing points detected from the disparity top view and the parallel lines regarded as the road partitions according to the embodiment of the present invention.

The road partitions are detected by the disparity top view. The height of road partitions can be ignored, because all of the slope roads, the fences with a height and the road shoulders are turned into the lines in the disparity top view. Therefore, many forms of road partitions such as fences, road shoulders and road partition lines can be detected at the same time by one calculation.

The present invention take full advantage of a feature that the parallel lines intersect at a point with zero disparity value in the disparity top view. Therefore, plural road partitions can be detected at the same time, and the accuracy of the detection is ensured because of the mutual restraint of the plural road partitions.

The above method of detecting the parallel lines illustrated in FIG. 6 is just an example, any one of the method detecting the parallel lines from the disparity top view may be applied to the present invention. For example, an alternative method of detecting the parallel lines is detecting the straight lines from the disparity top view, determining the intersection points at which the straight lines intersect each other, and determining the straight lines where the intersection points are located in an equal disparity line having a zero disparity point as the parallel lines.

<2.3.4 Further Distinguishment of Road Partitions>

A further distinguishment of the road partitions is performed according to at least one of height features, location features or area features of the detected road partitions in a corresponding disparity map, after the parallel lines of the disparity top view are determined as the road partitions.

Specifically, the parallel lines of the disparity top view may be restored in the disparity map, and the height features, location features or area features of the parallel lines of a corresponding area of the disparity map may be considered, so as to perform the further distinguishment of the road partitions. For example, if the height of the corresponding area of the disparity map meets a height range of the fence, it is determined that the road partition is the fence; if the height of the corresponding area of the disparity map meets a height range of the road shoulder, it is determined that the road partition is the shoulder. Additionally, in point of location, the road shoulders are usually located on both sides of the road, the fences are usually located in the middle of the road, and the road partition lines are usually dispersed in the road. In area, the fences have a largest area, the road shoulders come second, and the road partition lines have a smallest area. In this way, a further distinguishment of the road partitions can be performed by using the difference of the features among the road partitions. The features among the road partitions may also be applied to a verification of the detection result.

<2.4 Apparatus for Detecting Road Partitions>

Figure 11:
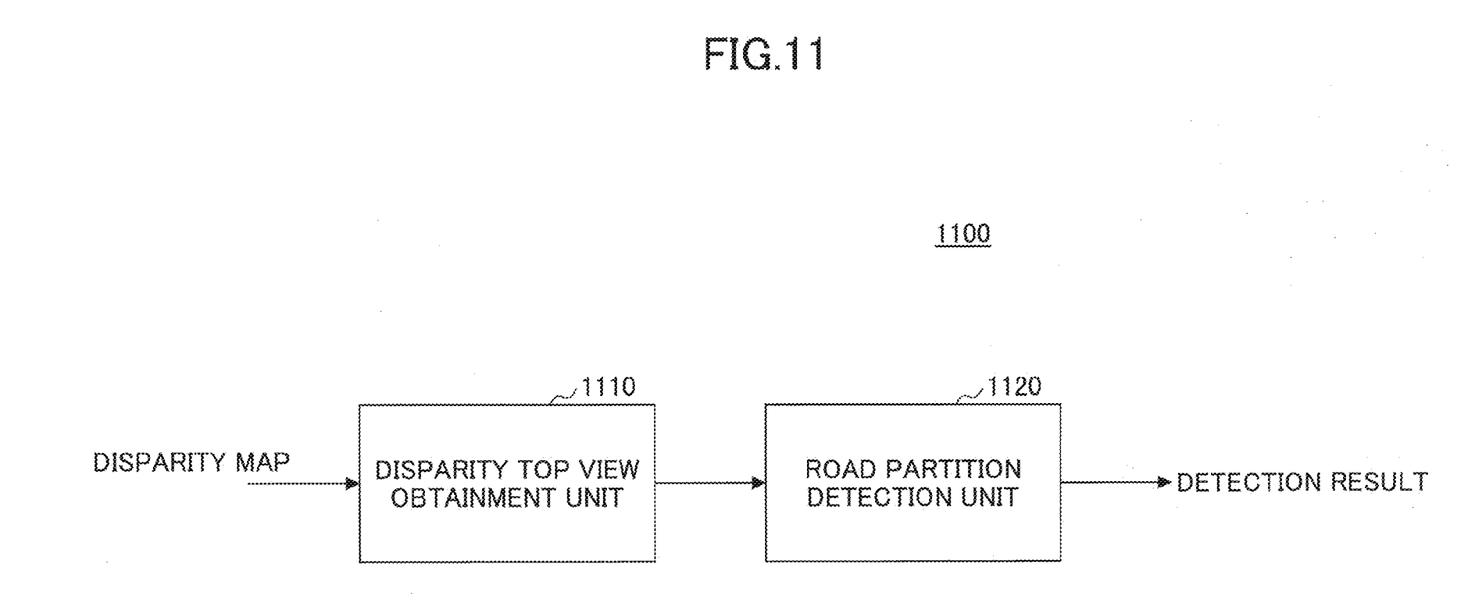
FIG. 11 is a block diagram illustrating an apparatus for detecting the road partitions according to the embodiment of the present invention.

FIG. 11 is a block diagram illustrating an apparatus 1100 for detecting the road partitions according to the embodiment of the present invention.

As illustrated in FIG. 11, the apparatus 1100 for detecting a road partition may comprise: a disparity top view obtainment unit 1110 for obtaining a disparity top view having a road area; and a road partition detection unit 1120 for detecting parallel lines as the road partition from the disparity top view.

Furthermore, the operation of detecting parallel lines from the disparity top view by the road partition detection unit 1120 may comprise: a step of regarding points with zero disparity value as basic points, and calculating included angles between straight lines determined by each point having non-zero disparity value of the disparity top view and the basic points, and an equal disparity line, so as to obtain angle distributions of the included angles of the basic points; and a step of detecting the parallel lines according to the angle distributions of the included angles of the basic points.

The step of detecting the parallel lines according to the angles of the basic points may comprise: a step of regarding top N basic points in descending order of degree of collectivity of the angle distributions of the included angles and/or the basic points having a value of degree of collectivity more than a predetermined threshold of degree of collectivity as road vanishing points, where N is an integer greater than or equal to one, the road vanishing point is a point at which the parallel road partitions intersect in the disparity top view, and the points at which the parallel road partitions in different direction intersect in the disparity top view are different; and a step of regarding straight lines, determined by the included angles and the road vanishing points that have occurrence degrees of angles in the angle distributions of the included angles of the road vanishing points that are more than a predetermined threshold, as the parallel lines in which the road partitions are located.

3. Summary

In the method and apparatus for detecting a road partition described above, the disparity top view having the road area is obtained, and the parallel lines are detected as the road partitions from the disparity top view.

The road partitions are detected in the disparity top view. The height of road partitions can be ignored, because all of the slope roads, the fences with a height and the road shoulders are turned into the lines in the disparity top view. Therefore, many forms of road partitions such as fences, road shoulders and road partition lines can be detected at the same time by one calculation.

The present invention takes full advantage of a feature that the parallel lines intersect at a point with a zero disparity value in the disparity top view. Therefore, plural road partitions can be detected at the same time, and the accuracy of the detection is ensured because of the mutual restraint of the plural road partitions.

Furthermore, it is difficult to process a non-planar road such as a slope road by a general method of detecting roads such as a method based on image recognition. In the disparity top view of the present invention, the effect of height of the road and the road partitions can be eliminated; therefore, the present invention can also be applied to detection of the road partitions of a uneven road.

As described above, in general, the disparity top view is converted from the disparity map. However, the disparity top view may be obtained by picking up by a special camera such as a binocular camera, a multi camera, a stereoscope camera and calculating, or by calculating from a depth map of a stereogram.

The above method of detecting the parallel lines is just an example, any one of the methods of detecting the parallel lines from the disparity top view may be applied to the present invention. For example, an alternative method of detecting the parallel lines is detecting the straight lines from the disparity top view, determining the intersection points at which the straight lines intersect each other, and determining the straight lines where the intersection points are located in an equal disparity line having a zero disparity point as the parallel lines.

The basic principle of the present invention is described above with reference to the embodiment. Any one or all of the steps or units of the method or apparatus according to the present invention may be implemented by hardware, software or their combination in any one of computing devices (including a processor, a storage medium, etc.) or a network of computing devices, and it can be implemented by persons skilled in the art who have read the specification of the present application.

Therefore, the present invention can also be realized by a program or a set of programs running on any one of computing devices. The computing devices may be well known general-purpose devices. Therefore, the present invention may also be implemented by providing a program product including program codes for implementing the method or apparatus.

That is to say, the program product also belongs to the present invention, and a storage medium storing the program product also belongs to the present invention. Obviously, the storage medium may be any one of well known storage media or storage media which are to be developed.

In addition, in the apparatus or method of the present invention, units or steps may be divided and/or recombined. The division and/or recombination should be regarded as an equivalent embodiment of the present invention. Steps of the above method may be performed in time order, however the performing sequence is not limited to the time order. Any steps may be performed in parallel or independently.

The present invention is not limited to the specifically disclosed embodiments, and variations and modifications may be made without departing from the scope of the present invention.

The present application is based on Chinese Priority Application No. 201110409269.1 filed on Dec. 9, 2011, the entire contents of which are hereby incorporated herein by reference.

What is claimed is:

1. A method for detecting road partitions, comprising:
obtaining a disparity top view of a road area; and
detecting parallel lines as the road partitions by,
determining a plurality of reference points, the plurality of reference points being points in the disparity top view having a zero disparity value,
determining each of a plurality of angles as an angle between a horizontal line, on which the plurality of reference points lie, and a plurality of lines, each of the plurality of lines connecting one of the plurality of reference points and one of a plurality of measurement points, each of the plurality of measurement points having a non-zero disparity value, and
detecting the parallel lines according to distributions of the plurality of determined angles.

2. The method for detecting road partitions according to claim 1, further comprising:
determining a distribution of each of the plurality of angles by determining a ratio between a number of the plurality of measurement points and a number of the plurality of lines that form one of the plurality of angles with the horizontal line.

3. The method for detecting road partitions according to claim 1, wherein a distribution of each of the plurality of angles is determined according to the following equation:

$$Dis_x(\theta) = \frac{C_\theta}{N}$$

where $\theta \in \Theta$ is one of the plurality of angles, x represents one of the plurality of reference points, N is a number of the plurality of measurement points, $\Theta$ is a set of angular values, and $C_\theta$ is a number of the plurality of lines forming the angle $\theta$ with the horizontal line.

4. The method for detecting road partitions according to claim 1, further comprising:
identifying the road partitions according to at least one of height features, location features and area features of the detected road partitions in a corresponding disparity map.

5. The method for detecting road partitions according to claim 1, wherein the obtaining obtains the disparity top view by converting a disparity map, wherein
an abscissa of the disparity top view is represented by u,
an ordinate of the disparity top view is represented by d, d presents disparity,
a value of each point $P_{ut}(u_i,d_i) \in U$ is a number of points of the disparity map for which a corresponding abscissa is $u_i$ and disparity is $d_i$, and
the value of each point $P_{ut}(u_i,d_i)$ that is less than a threshold is set to zero.

6. The method for detecting road partitions according to claim 1, wherein the obtaining obtains the disparity top view by,
obtaining a disparity map having the road area;
estimating the road area and removing a non-road area from the disparity map; and
obtaining the disparity top view of the road area by converting the disparity map where the non-road area has been removed.

7. An apparatus for detecting road partitions, comprising:
a memory configured to store computer-readable instructions; and
a processor configured execute the computer-readable instructions to,
obtain a disparity top view of a road area; and
detect parallel lines as the road partitions by,
determining a plurality of reference points, the plurality of reference points being points in the disparity top view having a zero disparity value,
determining each of a plurality of angles as an angle between a horizontal line, on which the plurality of reference points lie, and a plurality of lines, each of the plurality of lines connecting one of the plurality of reference points and one of a plurality of measurement points, each of the plurality of measurement points having a non-zero disparity value, and
detecting the parallel lines according to distributions of the plurality of determined angles.

8. The apparatus for detecting road partitions according to claim 7, wherein the processor is further configured to execute the computer-readable instructions to,
determine a distribution of each of the plurality of angles by determining a ratio between a number of the plurality of measurement points and a number of the plurality of lines that form one of the plurality of angles with the horizontal line.

9. The method for detecting road partitions according to claim 1, further comprising:
arranging the plurality of reference points in a descending order of collectivity of one or more of the plurality of lines at each of the plurality of reference points;
selecting a top number of the arranged plurality of reference points as vanishing points, the top number being an integer equal to or greater than 1, and
determining ones of the plurality of lines that terminate at the selected reference points as the road partitions.

10. The apparatus for detecting road partitions according to claim 7, wherein the processor is further configured to execute the computer-readable instructions to,
arrange the plurality of reference points in a descending order of collectivity of one or more of the plurality of lines at each of the plurality of reference points;
select a top number of the arranged plurality of reference points as vanishing points, the top number being an integer equal to or greater than 1, and
determine ones of the plurality of lines that terminate at the selected reference points as the road partitions.

11. The apparatus for detecting road partitions according to claim 7, wherein the processor is further configured to execute the computer-readable instructions to identify the road partitions according to at least one of height features, location features and area features of the detected road partitions in a corresponding disparity map.

12. The apparatus for detecting road partitions according to claim 7, wherein the processor is configured to obtain the disparity top view by converting a disparity map, wherein
an abscissa of the disparity top view is represented by u,
an ordinate of the disparity top view is represented by d,
d presents disparity,
a value of each point $P_{ui}(u_i,d_i) \in U$ is a number of points of the disparity map for which a corresponding abscissa is $u_i$ and disparity is $d_i$, and
the value of each point $P_{ui}(u_i,d_i)$ that is less than a threshold is set to zero.

13. The apparatus for detecting road partitions according to claim 7, wherein the processor is configured to obtain the disparity top view by,
obtaining a disparity map having the road area;
estimating the road area and removing a non-road area from the disparity map; and
obtaining the disparity top view of the road area by converting the disparity map where the non-road area has been removed.

14. The apparatus for detecting road partitions according to claim 7, wherein a distribution of each of the plurality of angles is determined according to the following equation:

$$Dis_x(\theta) = \frac{C_\theta}{N}$$

where $\theta \in \Theta$ is one of the plurality of angles, x represents one of the plurality of reference points, N is a number of the plurality of measurement points, $\Theta$ is a set of angular values, and $C_\theta$ is a number of the plurality of lines forming the angle $\theta$ with the horizontal line.

* * * * *